July 30, 1963 T. S. KULKA 3,099,414

TAPE REEL HAVING FRICTION REDUCING MEANS

Filed Feb. 27, 1961 2 Sheets-Sheet 1

INVENTOR
THOMAS S. KULKA

BY Elmon S. Nelson
ATTORNEY

July 30, 1963 T. S. KULKA 3,099,414

TAPE REEL HAVING FRICTION REDUCING MEANS

Filed Feb. 27, 1961 2 Sheets-Sheet 2

INVENTOR
THOMAS S. KULKA

BY Elmon S. Nelson
ATTORNEY

United States Patent Office 3,099,414
Patented July 30, 1963

3,099,414
TAPE REEL HAVING FRICTION REDUCING MEANS

Thomas S. Kulka, 200 Film Bldg., 2108 Payne Ave., Cleveland, Ohio

Filed Feb. 27, 1961, Ser. No. 91,888
1 Claim. (Cl. 242—71.8)

This invention relates to winding and reeling and more particularly to a reel for use with tape, such as that commonly used in the magnetic recording of sound and also for video recording purposes and in which the reel is provided with means for reducing friction between the edges of the tape and the inner surfaces of the flanges of the reel. This invention represents an improvement over that described and claimed in my co-pending application Serial No. 834,166 filed August 17, 1959, now Patent No. 2,973,159, dated February 28, 1961.

In the use of sound recording and play back apparatus, as well as in the use of video tape apparatus of the type utilizing tape wound on reels, considerable difficulty has been experienced due to the friction between the edges of the tape and the inner surfaces of the flanges of the reel. This is particularly troublesome in reels of larger diameters and the situation is further aggravated by the fact that frequently the flanges are somewhat distorted or a slight misalignment obtains between reels on which the tape is being wound, thereby providing a non-uniform frictional engagement between the inner surfaces of the reel flanges and the edges of the tape. As a result, the quality of the recording on the tape or reproduction of the same has been adversely affected and in certain extreme cases, the friction between the flanges and the tape may be sufficient to cause breakage of the tape.

It is accordingly an object of the invention to provide a tape reel incorporating means for reducing and maintaining at a minimum friction between the edges of the tape and the inner surfaces of the flanges of the reel and especially adjacent their peripheries.

A further object of the invention is the provision of a friction reducing tape reel which may be conveniently and economically manufactured by conventional molding methods and in any desired sizes.

A still further object of the invention is the provision of a friction reducing tape reel in which means is provided on the inner surfaces of the flanges of the reel to reduce the area of contact between the edges of the tape and the inner surfaces and especially adjacent the peripheral edges thereof of such flanges.

Another object of the invention is the provision of a friction reducing tape reel in which the friction reducing means provided on the flanges of the reel is effective even though the flanges may be distorted.

A further object of the invention is the provision of a friction reducing tape reel in which the inner surface of each flange of the reel is provided with a plurality of radially extending inwardly projecting ribs and also, with a plurality of radially spaced circular concentric ribs intersecting the radial ribs and providing inwardly opening generally rectangular recesses.

A still further object of the invention is the provision of a friction reducing tape reel in which the inner surface of each flange of the reel is provided with a series of outwardly extending ribs curved in one direction and a second series of outwardly extending ribs curved in the opposite direction and intersecting the first ribs to provide inwardly opening diamond-shaped recesses.

Another object of the invention is the provision of a friction reducing tape reel in which the inner surface of each flange of the reel is provided with a plurality of spaced outwardly extending ribs curved in one direction.

Another object of the invention is the provision of a friction reducing tape reel in which the inner surface of each flange of the reel is provided with straight inwardly projecting outwardly extending ribs, such ribs intersecting each other to provide a generally diamond pattern providing inwardly opening recesses.

A further object of the invention is the provision of a friction reducing tape reel in which the inner surface of each flange of the reel is provided with a plurality of spaced outwardly extending ribs of serpentine form and a plurality of circular radially spaced concentric ribs intersecting the serpentine ribs.

A still further object of the invention is the provision of a friction reducing tape reel in which the inner surface of each flange of the reel is provided with a plurality of spaced inwardly projecting outwardly extending ribs of serpentine form and a plurality of generally circular concentric ribs of serpentine form intersecting the first ribs.

Another object of the invention is the provision of a friction reducing tape reel in which the inner surface of each flange of the reel is provided with a plurality of generally radially extending inwardly projecting ribs, each rib being in the form of a succession of chevrons.

A further object of the invention is the provision of a friction reducing tape reel in which the inner surface of each flange of the reel is provided with a plurality of radially extending ribs extending from the hub to the peripheral edge of the flange, a second series of radially extending ribs extending from the peripheral edge of the flange to a point spaced outwardly of the hub and a plurality of circular concentric ribs intersecting the other two sets of ribs.

A still further object of the invention is the provision of a friction reducing tape reel in which the inner surface of each flange of the reel is provided with friction reducing means in the form of ribs, such ribs terminating at the peripheral edge of the flange in a curved end.

Further objects and advantages of the invention will be apparent from the following description taken in conjunction with the accompanying drawings wherein.

Figure 2:
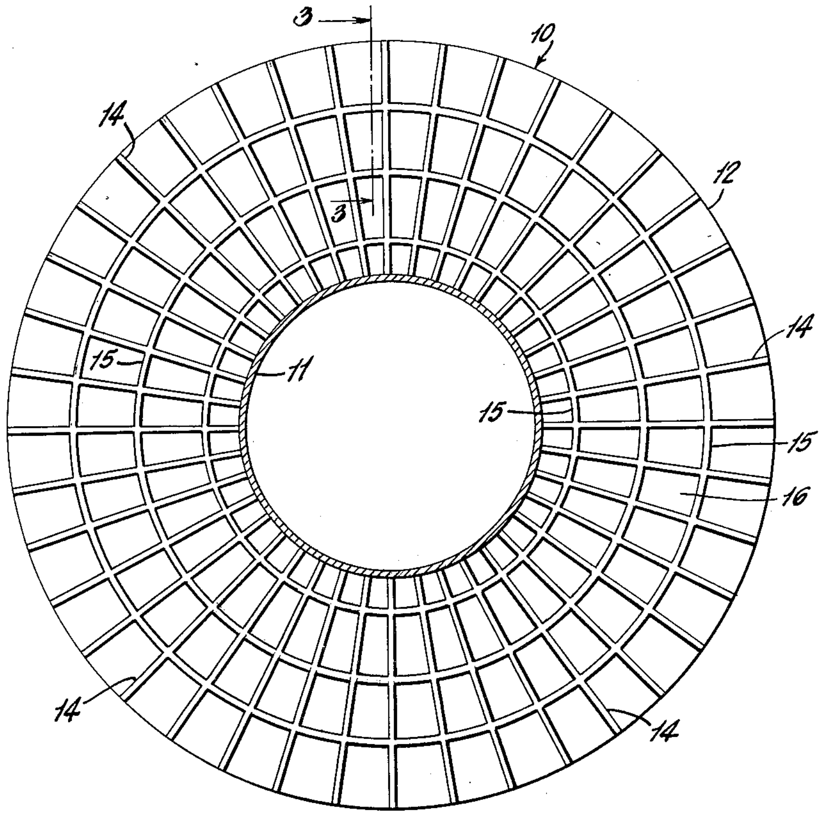
FIG. 2 is a sectional view taken substantially on the line 2—2 of FIG. 1 and showing the formation of the inner surface of one of the flanges of the reel.
Figure 3:
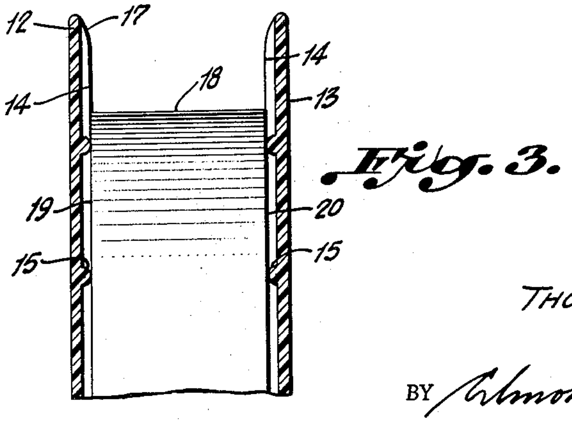
Figure 4:
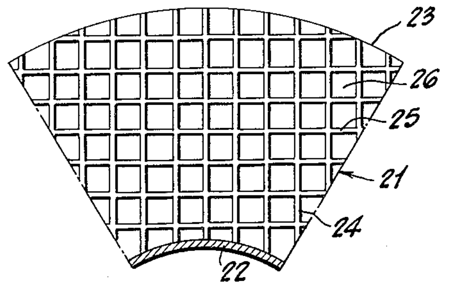
Figure 5:
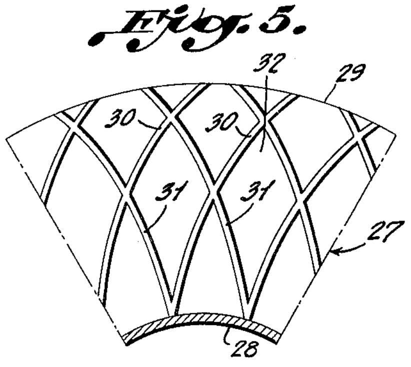

FIG. 3 a fragmentary sectional view to an enlarged scale and taken substantially on the line 3—3 of FIG. 2 showing the engagement between the edges of tape and the ribs provided on the inner surface of the reel flanges;

FIG. 4 a fragmentary sectional view showing a different rib formation on the inner surface of the flange;

FIG. 5 a view similar to FIG. 4, but showing another rib formation.

Figure 6:
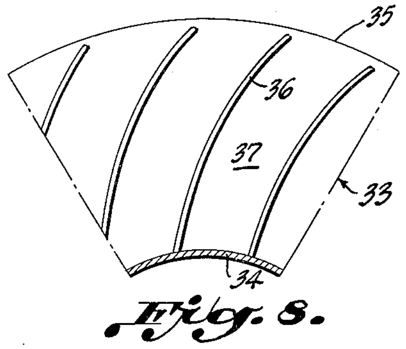
Figure 7:
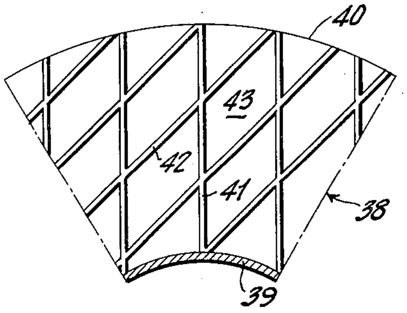
Figure 8:
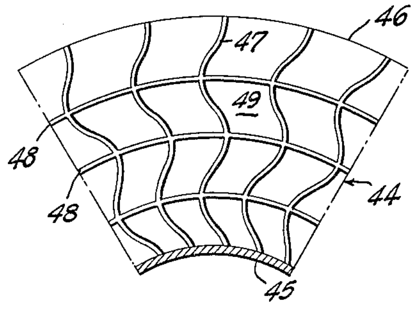
Figure 9:
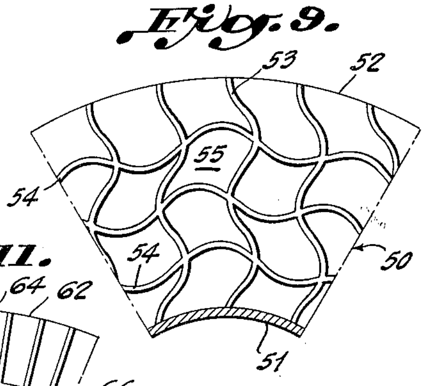
Figure 10:
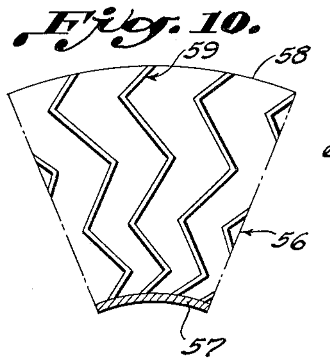

FIG. 6 a view similar to FIG. 4 and showing still another rib formation;

FIG. 7 a view similar to FIG. 4 and showing a further modification of the rib structure;

FIG. 8 a view similar to FIG. 4 showing a still further modified form of rib structure;

FIG. 9 a view similar to FIG. 4 and showing another form of rib structure;

FIG. 10 a view similar to FIG. 4 and showing still another form of rib; and

Figure 11:
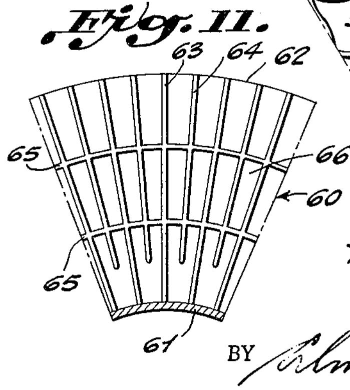

FIG. 11 a view similar to FIG. 4 and showing a modification of the rib structure shown in FIG. 2.

Figure 1:
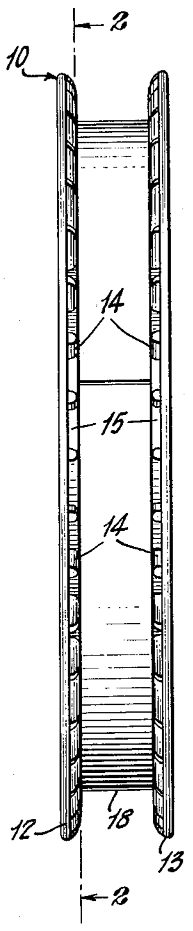
FIG. 1 is a side elevational view of a friction reducing tape reel constructed in accordance with this invention.

With continued reference to the drawings and particularly FIGS. 1 to 3, there is shown a friction reducing tape reel 10 constructed in accordance with this invention and which may well comprise a hub 11 provided with spaced radially extending flanges 12 and 13. The reel 10 may be molded of plastic or other suitable material in a conventional manner and hub 11 may be of a standard diameter to be received on conventional magnetic recording or play back apparatus or on video tape apparatus and the flanges 12 and 13 may be of a suitable diameter to provide a reel of the desired capacity.

Since the inner surfaces of the flanges 12 and 13 are identical, a description of one flange will suffice and with particular reference to FIG. 2, it will be seen that the inner surface of flange 12 is provided with a plurality of spaced radially extending inwardly projecting ribs 14 of generally arcuate cross section as shown in FIG. 3, and with a plurality of radially spaced circular concentric ribs 15 of similar shape with the ribs 15 intersecting the radial ribs 14 to provide a plurality of inwardly opening recesses 16 between the ribs. As shown in FIG. 3, the ribs 14 are radiused or curved at their outer ends as shown at 17 to become gradually of zero height at the flange periphery, for a purpose which will presently appear. It is to be noted that the radial ribs 14 extend from the hub 11 to the outer peripheral edge of the flange 12, but in certain instances, it might be desirable to terminate these ribs inwardly of the peripheral edge of the flange 12.

The tape 18 is wound on the hub 11 between the flanges 12 and 13 and as clearly shown in FIG. 3, the edges 19 and 20 of the tape 18 contact the peaks or crests of the ribs 14, rather than the flat surface of the flanges 12 and 13 and consequently, friction between the edges of the tape 18 and the inner surfaces of the flanges 12 and 13 is maintained at a minimum. The curved outer ends 17 of the ribs 14, whereby they gradually become of zero height at the outer peripheries of the flanges, facilitate winding of the tape 18 on the reel, since if the tape is somewhat out of line with the reel, the edge of the tape may contact the curved end 17 for light contact guidance of the tape between the reel flanges.

In addition to maintaining friction at a minimum between the tape and the reel flanges, the recesses 16 provided by the ribs 14 and circular ribs 15 provide spaces for receiving dust or other foreign matter which may be wiped off the edges of the tape by the wiping contact between the tape and the crests of the ribs and since dust or other foreign material is most likely to adhere to the edges of the tape, rather than to the surface thereof, since such edges are more exposed than the surface, the provision of the recesses 16 to receive such foreign material which is removed by the wiping contact between the edges of the tape and the ribs serves to prevent a reduction in quality of the recorded sound or the video recording due to the presence of dust or other foreign material.

A slightly modified form of the invention is shown in FIG. 4 in which a reel 21 is provided with a hub 22 and flanges 23. The inner surface of each flange 23 is provided with inwardly projecting ribs disposed in a right angular arrangement to provide a waffle pattern and in which ribs 24 extend outwardly and terminate at the peripheral edge of the flange 23 and ribs 25 extend at right angles to the ribs 24 and also terminate at the peripheral edge of the flange 23. The outer ends of the ribs 24 and 25 are curved as shown at 17 in FIG. 3 and described above and in this form of the invention serve exactly the same purpose. The intersecting ribs 24 and 25 serve to provide inwardly opening recesses 26 which are rectangular and serve to receive dust or other foreign material in the same manner as described above in connection with FIGS. 1 and 3.

A still further form of the invention is shown in FIG. 5 in which a reel 27 is provided with a hub 28 and radially extending side flanges 29. Provided on the inner surface of each flange 29 is a series of inwardly projecting spaced ribs 30 and as will be seen from an inspection of FIG. 5, the ribs 30 extend outwardly from the hub 28 to he peripheral edge of the flange 29 and are curved in one direction. A second series of inwardly projecting spaced ribs 31 are also provided on the inner surface of each flange 29 and the ribs 31 are extended outwardly from the hub 28 to the peripheral edge of the flange 29 and all of the ribs 31 are curved in the opposite direction from the ribs 30. The ribs 31 intersect the ribs 30 in order to provide inwardly opening recesses 32 in the inner face of each flange 29, these recesses serving the same purpose as those described above in connection with FIGS. 1 to 3 and, in a similar manner, the outer ends of the ribs 30 and 31 are curved in order to guide the tape between the flanges.

The modified form of the invention shown in FIG. 6 is somewhat similar to that shown in FIG. 5, and in FIG. 6 there is provided a reel 33 having a hub 34 and spaced side flanges 35. Each flange 35 is provided on the inner surface thereof with a series of inwardly projecting spaced ribs 36, all of which are curved in one direction and extend from the hub 34 to adjacent the peripheral edge of the flange 35. In distinction from some of the other forms of the invention above described, the outer ends of the ribs 36 are not curved. The spaces 37 between the ribs 36 serve to receive foreign material wiped from the tape during winding or unwinding thereof.

With particular reference to FIG. 7, there is shown a still further form of the invention in which a reel 38 is provided with a hub 39 and spaced side flanges 40. The inner surface of each flange 40 is provided with inwardly projecting ribs 41 and 42 and it will be noted, that these ribs are disposed at an angle to each other to provide recesses therebetween, as indicated at 43, having substantially a diamond shape and these recesses serve to receive foreign material in the same manner as described above. Also similar to the structure described above, the outer ends of ribs 41 and 42 adjacent the peripheral edge 40 are curved.

In FIG. 8 there is shown a further modification of the invention which is somewhat similar to that shown in FIGS. 1 to 3, there being provided a reel 44 having a hub 45 and spaced side flanges 46. The inner surface of each flange 46 is provided with a series of inwardly projecting ribs 47 and as shown in FIG. 8, the ribs 47 extend outwardly from the hub 45 in a substantially serpentine formation. The ribs 47 terminating in curved edges at the peripheral edge of the flange 46. A plurality of radially spaced circular concentric ribs 48 are also provided, which ribs intersect the ribs 47 to provide inwardly opening recesses 49 for receiving foreign material in the manner described above.

The form of the invention shown in FIG. 9 is somewhat similar to that shown in FIG. 8 and includes reel 50 having a hub 51 and spaced side flanges 52. The inner surface of each flange 52 is provided with a plurality of spaced outwardly extending ribs 53 which follow a serpentine path and terminate at the peripheral edge of the flange 52 in a curved end. A plurality of spaced generally circular ribs 54 also of serpentine form, intersect the ribs 53 to provide inwardly opening recesses 55 for receiving foreign material in the manner described above.

A still further modified form of the invention is shown in FIG. 10 in which a reel 56 is provided with a hub 57 and spaced side flanges 58. Each side flange 58 is provided on the inner surface thereof with inwardly projecting ribs 59 which extend from the hub 57 outwardly to the peripheral edge of the flange 58 and terminate in curved ends as described above. Each of the ribs 59 is formed as a succession of chevrons as clearly shown in FIG. 10 and this provides an arrangement which efficiently removes dirt or other foreign material from the edges of the tape.

FIG. 11 shows a modified form of the invention somewhat similar to that shown in FIGS. 1 to 3 and in this form of the invention, a reel 60 is provided with a hub 61 and spaced side flanges 62. A plurality of ribs 63 project inwardly from the inner surface of each side flange 62 and the ribs 63 extend radially outwardly from the hub 61 to the peripheral edge of the flange 62 and each of the ribs 63 terminate the outer end in a curve. Disposed between each pair of ribs 63 is radially extending ribs 64 which extend inwardly from the peripheral edge of the flange 62 and terminate at a point spaced from the hub 61. The ribs 64, likewise, terminate in a curved outer end. Circular radially spaced concentric ribs 65 intersect with the ribs 63 and 64 to provide inwardly opening recesses 66 which serve to receive foreign material wiped from the tape in the manner described above.

It will be seen that by the above described invention there has been provided a friction reducing tape reel in which various formations are utilized on the inner surfaces of the reel flanges to reduce friction between the edges of the tape and the flanges and also at the same time, to facilitate the removal of dust or other foreign materials from the edges of the tape, the rib formations on the inner surface of the flanges providing recesses for receiving such foreign material.

It will be obvious to those skilled in the art that various changes may be made in the invention without departing from the spirit and scope thereof and therefore the invention is not limited by that which is shown in the drawings and described in the specification, but only as indicated in the appended claim.

What is claimed is:

A friction reducing tape reel comprising a hub, parallelly spaced radially extending flanges on said hub, ribs on the inner face of each of said radially extending flanges, the ribs on each of said flanges extending inwardly towards each other in facing relation and generally outwardly from said hub to the periphery of each of said radially extending flanges, the outer end of each of said ribs being curved to gradually reduce its height to zero and gradually merge into the periphery of the flange, said curved rib ends being adapted to provide light contact guidance for the tape during reeling movement thereof relative to the reel under slight misalignment conditions of the reel and tape to minimize objectionable frictional effects.

References Cited in the file of this patent

UNITED STATES PATENTS

| | | |
|---|---|---|
| 1,417,313 | Gammeter | May 23, 1922 |
| 1,819,707 | German | Aug. 18, 1931 |
| 1,954,841 | Porter | Apr. 17, 1934 |
| 2,881,894 | Regentrop et al. | Apr. 14, 1959 |
| 2,973,159 | Kulka | Feb. 28, 1961 |
| 2,990,133 | Tucker | June 27, 1961 |